May 4, 1965    N. F. MULLANEY ETAL    3,181,440
STAMPED TREAD PLATE
Filed March 15, 1962
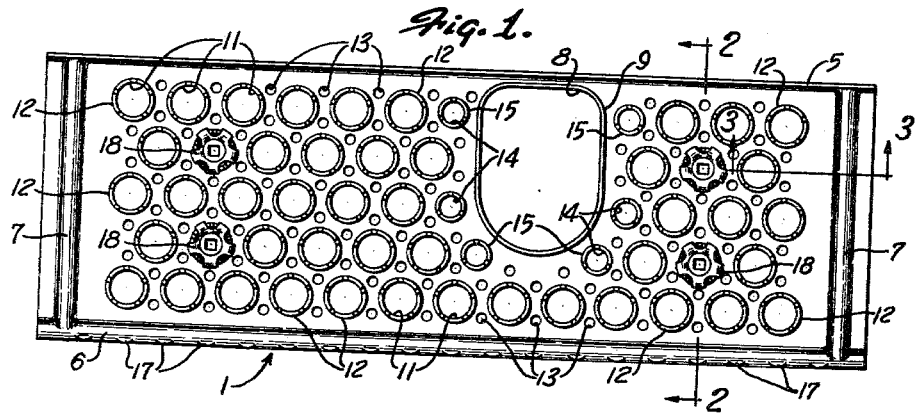
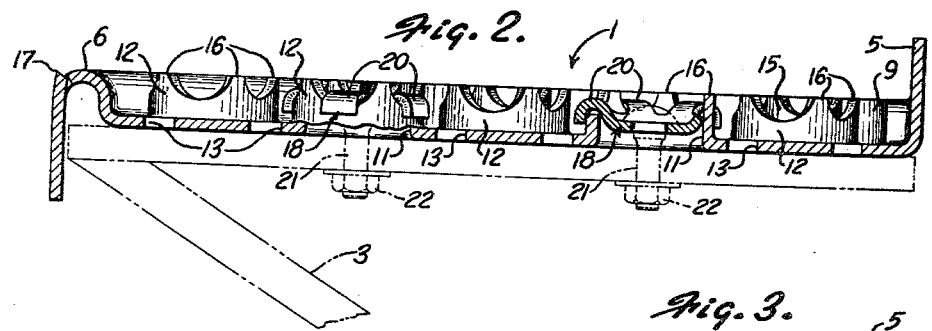
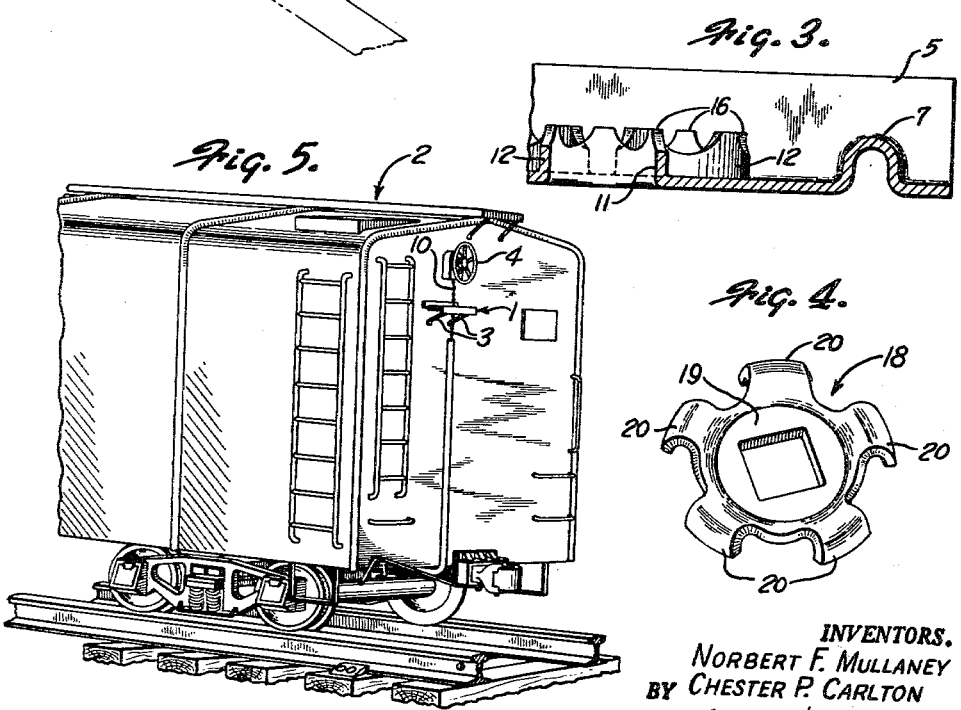
INVENTORS.
NORBERT F. MULLANEY
BY CHESTER P. CARLTON
Andrus & Starke
ATTORNEYS

United States Patent Office 3,181,440
Patented May 4, 1965

3,181,440
STAMPED TREAD PLATE
Norbert F. Mullaney, Milwaukee, and Chester P. Carlton, Brookfield, Wis., assignors to A. O. Smith Corporation, Milwaukee, Wis., a corporation of New York
Filed Mar. 15, 1962, Ser. No. 179,899
2 Claims. (Cl. 94—5)

This invention relates to metal tread plates of the type which are self-cleaning and draining and particularly to tread plates of this type having a stamped construction.

The tread plates with which the invention is concerned are of stamped manufacture and have a substantially open surface construction so as to enable foreign matter such as snow, ice, dirt and the like which might otherwise accumulate on the plate when in use to drop therethrough and all condensation, rain and other precipitation to drain therefrom. The actual tread portion of these plates consists of a plurality of raised gripping edges such as flanges and/or bosses arranged in a predetermined pattern over the plate surface to provide the plate as a whole with a skid resistant characteristic.

Several different designs of stamped tread plates have been developed and used from time to time but up to now these designs have not been altogether satisfactory or as effective as desired in one or more respects. For example, in some designs, the gripping edges were not sufficient in number nor spaced sufficiently close together to preclude the possibility of footgear entering and perhaps wedging or catching therebetween and causing the wearer to lose his balance and fall. Further, in most known plates, the marginal portions were completely void of gripping edges out of structural necessity. It was therefore necessary to avoid stepping near or on the edges of the plate to avert possible slipping or sliding off the plate. In other designs, there was no provision for draining water from the plate proper and thus rain and other precipitation collected on the plate surface around the gripping edges and eventually impaired their effectiveness in preventing slipping.

The present invention is directed to a metal tread plate of stamped construction which eliminates the above referred to drawbacks of prior designs and which is of fairly simple and inexpensive manufacture.

In accordance with the invention, the tread plate is provided with both cleaning and draining openings in its surface and each of the cleaning openings is formed integrally with an upstanding flange having a gulleted edge construction. The cleaning openings are arranged in laterally and longitudinally extending rows and adjacent rows are staggered relatively of one another in both directions to permit a maximum number of such openings in the plate for any given structural requirements whereby the plate may effectively eliminate obstructing matter tending to collect thereon in use. The drain openings are fairly small in size compared to the cleaning openings and are located between and around the latter to prevent any condensation, rain and other precipitation from collecting on the plate.

The flanges are struck to a single level above the plate proper to provide the tread of the plate and, by reason of the aforesaid pattern of the cleaning openings are spaced sufficiently close to close the plate surface to the entry of footgear, thereby precluding the possibility of tripping when walking or stepping on the plate. Additionally, the serrated construction of the edges of the flanges gives the plate a highly skid proof tread portion.

It has been found of particular advantage to utilize an extrusion process in forming the flanges whereby the flange metal may be thinned out to provide a commensurate increase in flange height. The flanges are thereby rendered more effective in inhibiting slipping on the plate under extreme conditions and further, the overall rigidity of the plate is increased to some extent. Additionally, by extruding the flanges, the latter may be formed around a shorter radius of curvature relative to the plate proper and, as a result, a maximum amount of web material is provided between cleaning openings for the drain openings.

The edges of the plate insofar as consistent with its ultimate intended use are formed with corrugated ribs extending upwardly substantially to the level of the flanges to thereby provide for footing along the marginal portions of the plate. These ribs are of further important advantage in that they impart added rigidity to the plate, enabling a strong, lightweight construction therefor.

There thus is described a tread plate capable of providing sure and positive footing over its full tread area and which is able to effectively clean and drain itself of all foreign matter which might otherwise render the plate unsafe for use.

The accompanying drawing illustrates the best mode presently contemplated of carrying out the invention.

In the drawing:

FIG. 1 is a plan view of the tread plate of the invention with a number of fastening clips used in mounting the plate shown in preselected of the plate openings;

FIG. 2 is a cross section of the tread plate along the lines 2—2 of FIG. 1 including support brackets for the plate shown in phantom;

FIG. 3 is a fragmentary section of the plate along the lines 3—3 of FIG. 1;

FIG. 4 is an enlarged perspective view of one of the fastening clips shown in FIGS. 1 and 2; and FIG. 5 is a perspective view of a railroad box car from one end thereof with the tread plate of the invention mounted thereon.

For purposes of illustration, the tread plate 1 embodying the present invention is shown mounted to the end of a railroad box car 2 on a pair of support brackets 3 projecting outwardly from the car where it serves as a platform or step for the brakeman in actuating the car brake wheel 4. The tread plate 1 is formed of a generally rectangular sheet of suitable carbon or alloy steel or aluminum, for example, and is turned up along one longitudinal edge to form a flange 5 adapted to abut car 2 in the assembled position of the plate. The opposed longitudinal edge of plate 1 and which corresponds to the front edge of the latter is formed with a raised rib or corrugation 6 while the lateral edges are similarly formed with the raised corrugations 7. For the present application of the invention, the surface of the plate is provided with a large sized generally U-shaped opening 8 the edge of which is struck upwardly from the underside of the plate to form a surrounding flange 9. Opening 8 accommodates a brake chain 10 hanging down from and fastened to brake wheel 4 as is conventional. The precise size, shape and location of opening 8 in the plate depends upon the particular location of the wheel on car 2 and can be varied as desired without departing from the scope of the invention.

In accordance with the invention, the main portion of the plate surface is taken up by openings which are punched in the plate in a predetermined pattern, including a series of relatively large cleaning openings 11 having flanges 12 which are formed upwardly from the underside of the plate by a metal stamping process, which also forms a series of smaller drain openings or holes 13 located in the plane of the plate. The openings 11 and 13 provide the plate with self-cleaning and draining properties whereby snow, sleet, ice, rain and other matter of a similar nature tending to collect on the plate in use may be eliminated to prevent the plate from becoming slippery and unsafe for use. In order to provide a maximum of open area in the plate surface consistent with the structural requirements of the plate, openings 11 are arranged in longitudinally and laterally extending rows with the adjacent rows being staggered relatively of one another in both directions. As a result of this arrangement, it is possible to provide a close spacing of the rows of openings 11 in both directions and still retain sufficient web material around the openings to provide the necessary rigidity and strength for a given plate thickness to support the weight of the brakeman when operating brake wheel 4. In the illustrated construction of plate 1, a limited number of smaller cleaning openings 14 are provided adjacent and around brake chain opening 8 in those longitudinal rows of openings 11 wherein there is insufficient space to provide a full size opening 11 without unduly weakening the plate. Openings 14 are substantially similar to openings 11 except for size and include the integrally formed, surrounding flanges 15. It will be appreciated that the flanged construction of openings 11 and 14 as well as that of brake chain opening 8 imparts added rigidity to the plate and compensates in part for the material removed in their formation.

The drain holes 13 serve to drain the plate surface of rain and other precipitation and all condensation which would otherwise collect between openings 11, thus keeping the plate reasonably dry at all times. As shown, holes 13 are located in clusters around each of openings 11 and collectively provide a ready and effective means for draining the entire plate surface.

The actual tread area of plate 1 is formed principally of flanges 12 which are struck to a common level above the plane of the plate. Flanges 12 are of necessity located in close proximity to one another over the plate owing to the aforesaid pattern of openings 11 and, as a result, there is little risk of footgear entering between the flanges and wedging or catching in the plate so as to cause the brakeman to lose his balance and fall. In this connection, flanges 15 of openings 14 as well as the flange 9 of brake chain opening 8 are also struck to the level of flanges 12 and thereby provides safe and sure footing in the area of the plate immediately around the chain opening. To enhance the gripping action of flanges 12 and 15, their marginal portions are preferably gulleted to provide a number of fairly deep truncated gripping edges 16 in each of the flanges as shown. Edges 16, by reason of their design, serve further to aid in breaking up any obstructing materials such as ice and snow which may be present on the flanges under the weight of the brakeman. At the same time, however, edges 16 are not sharp enough to cause injury if for some reason the brakeman loses his balance and falls or grabs onto the plate.

The flanges 12 and 15 are preferably formed by a metal stamping operation and are thinned out or reduced in thickness over the parent metal of the plate as they are formed in order to provide a corresponding increase in the height of the flanges so that they extend above the plate a distance substantially greater than the plate thickness. Not only does this added height add somewhat to the overall rigidity of the plate but further improves the ability of the flanges, and in particular the gripping edges 16 thereon, to remain free of obstructing materials which might tend to accumulate temporarily on the plate from time to time. The thinning of the flanges gives rise to several other important advantages. For example, a certain amount of work hardening of the flanges is achieved as a result of the metal forming operation, thus improving the wear resistant abilities of gripping edges 16. In addition, by thinning flanges 12 and 15, it is possible to form the flanges around a shorter radius of curvature as compared to a straight punching or pressing operation in which no metal thinning takes place, for example, thus further adding to plate stiffness and, of equal importance, increasing the available web material between openings 11 for the provision of drain holes 13. In this manner, the metal thinning performed on the plate contributes substantially to improving the plate both structurally and functionally.

In the stamped type of tread plate, the marginal portions of the plate are necessarily left void of openings of any type in order to maintain the necessary rigidity thereat and, in all known prior designs, there were as a consequence no gripping edges or other means for providing or assisting in providing proper footing along the plate edges. Thus, in the instance of a brake step, there was the danger of the brakeman slipping and falling off the plate when stepping close to or on the edge of the plate. In the present invention, this particular shortcoming of previous designs is surmounted through the provision of the previously referred to corrugations 6 and 7 along the front longitudinal edge and both side edges of the plate respectively. Corrugations 6 and 7 are preferably struck to the level of flanges 12 and the rows of openings 11 are extended sufficiently in both directions such that flanges 12 on the outer of openings 11 are sufficiently close to the corrugations to provide positive traction and footing along the plate edges. From the standpoint of safety, this particular aspect of the present tread plate is highly desirable.

As a further safety measure, the outer, top portion of corrugation 6 is lanced at closely spaced intervals along its length and the lanced portions are punched outwardly and upwardly to form a series of tab-like gripping edges 17 extending in a row along the top of the corrugation as shown. Thus, in the event of the brakeman stepping onto the extreme front edge of the plate, edges 17 will be effective to prevent slipping.

The provision of corrugations 6 and 7 in the plate is of further advantage in that they reinforce the plate against buckling relative to both the longitudinal and lateral axes of the plate. As a consequence, the plate may be made extremely lightweight in its overall construction and yet at the same time possess the required strength and durability to stand up under prolonged use.

Referring to the attachment of plate 1 to brackets 3, it is contemplated to use an adjustable tie-down means to allow for possible varying spacing between the brackets from one car to the next. The illustrated tie-down is comprised of a number of the generally disc-shaped fastening clips 18 each of which is formed with an apertured center portion 19 and a series of outwardly curved retainer tabs or ears 20 integral therewith. Clips 18 are adapted to be insertable within any of the individual plate openings 11 from the top side of plate 1 with ears 20 engaging over the corresponding flange 12 of the opening between the gripping edges 16 to retain the clips in place whereby attachments may be made directly through the plate as dictated by the spacing of the brackets. In installing plate 1, the latter is placed in a generally centered position on brackets 3 with a lateral row of openings 11 disposed as near as possible directly over each of the brackets. The clips 18, of which four are shown, are then assembled in preselected of these openings 11 and equally between each bracket 3 whereupon a bolt 21 is passed downwardly through the center portion 19 of each of the clips and through suitable registering openings provided in brackets 3. Bolts 21 are then drawn tight to clips 18 by means of the nuts 22 on their lower ends to thereby clamp plate 1 firmly against brackets 3. In this manner then, suitable provision is made for overcoming the lack of a uniform spacing of the support brackets.

The depth of gripping edges 16 in flanges 12 is sufficient such that with the clips assembled in openings 11, ears 20 lie below the top of edges 16 as shown. With this arrangement, clips 18 are prevented from interfering with the gripping and cleaning action of edges 16 of the openings in which they are inserted.

The tread plate of the invention may be used in applications other than that specifically illustrated by modifying the plate in non-essential respects. Thus, for example, a series of these plates could be used in forming a continuous runway along the roof of the car in which case the plate construction described above would be modified by forming both longitudinal edges of the plate with a corrugation 6 and by eliminating chain opening 8 and extending the pattern of openings 11 and drain holes 13 through this portion of the plate. It may also be found of advantage to eliminate the corrugations along one or both of the lateral edges of the plate in applications of this nature due to the plates abutting along their ends in the assembled runway. Such a construction would of course effect a slight reduction in the overall rigidity of the plate, however.

The proposed plate can also be used individually or in series in forming stair treads, walkways, catwalks and the like in industry and as covers for openings in sidewalks to mention some of its other commercial applications.

The one-piece construction of the proposed tread plate is highly desirable from a manufacturing standpoint and together with the various features described results in a high strength, lightweight plate design.

Various modes of carrying out the invention are contemplated as being within the scope of the following claims particularly pointing out and distinctly claiming the subject matter which is regarded as the invention.

We claim:

1. A lightweight, unitary sheet metal tread plate having a series of relatively large openings provided therein for passing obstructing material through the surface of the plate, said plate having a continuous interconnecting, flat web portion, formed integrally with surrounding flanges struck to a common level above the flat web portion to provide a non-skid tread surface, said flanges extending above said plate a distance substantially greater than the plate thickness and being thinner than said plate, said flanges having a gulleted edge construction providing individual truncated gripping and cutting edges in each of said flanges to increase the traction of said tread surface and to facilitate breaking up of obstructing material on said surface, said web portion further being provided with a series of drain holes surrounding each of said larger openings for draining water from the plate surface and said plate being further formed with corrugated stiffening ribs extending along preselected edges of the plate and extending upwardly to the top level of the flanges to provide footing along the corresponding edges of the plate.

2. The construction of claim 1 wherein the top of at least one of said corrugated stiffening ribs is lanced at predetermined intervals along its length to provide a row of raised tab-like gripping edges therein to thereby inhibit slipping on the corresponding edge of the plate.

References Cited by the Examiner

UNITED STATES PATENTS

| | | | |
|---|---|---|---|
| 894,801 | 7/08 | Schachner | 94—5 X |
| 937,415 | 10/09 | Cairns | 94—5 X |
| 960,048 | 5/10 | Simpson | 94—5 X |
| 1,076,017 | 10/13 | Chase | 20—79 |
| 1,101,012 | 6/14 | Daly | 94—5 |
| 1,215,235 | 2/17 | Atwood | 20—79 |
| 1,680,032 | 8/28 | Anderson | 20—79 |
| 1,707,533 | 4/29 | Nagin | 189—84 |
| 2,091,157 | 8/37 | Moorman | 94—5 |
| 2,278,554 | 4/42 | Mortond | 94—5 X |
| 2,668,484 | 2/54 | Bustin | 94—5 |
| 2,830,509 | 4/58 | Bustin | 94—5 |

JACOB L. NACKENOFF, *Primary Examiner.*